(12) United States Patent
Ilse et al.

(10) Patent No.: US 11,248,522 B2
(45) Date of Patent: Feb. 15, 2022

(54) DEVICE FOR CONTROLLING THE SWIRL OF A FLUID FLOWING IN A PIPELINE

(71) Applicant: ContiTech MGW GmbH, Hannoversch Muenden (DE)

(72) Inventors: Dennis Ilse, Landolfshausen (DE); Harald Kreidner, Hannoversch Muenden (DE); Holger Fassl, Calden (DE)

(73) Assignee: ContiTech MGW GmbH

( * ) Notice: Subject to any disclaimer, the term of this patent is extended or adjusted under 35 U.S.C. 154(b) by 136 days.

(21) Appl. No.: 16/503,520

(22) Filed: Jul. 4, 2019

(65) Prior Publication Data

US 2020/0182144 A1 Jun. 11, 2020

(30) Foreign Application Priority Data

Dec. 7, 2018 (DE) .................. 10 2018 211 636.9

(51) Int. Cl.
*F02B 37/24* (2006.01)
*F02B 29/04* (2006.01)
(Continued)

(52) U.S. Cl.
CPC .......... *F02B 37/24* (2013.01); *F02B 29/0406* (2013.01); *F04D 29/661* (2013.01); *G01F 1/20* (2013.01); *F05D 2260/14* (2013.01)

(58) Field of Classification Search
CPC ...... F02B 37/24; F02B 37/12; F02B 29/0406; F02B 37/00; G01F 1/20; F04D 29/661;
(Continued)

(56) References Cited

U.S. PATENT DOCUMENTS

| 6,170,338 B1 | 1/2001 | Kleven et al. |
| 6,273,056 B1 | 8/2001 | Shirakawa et al. |

(Continued)

FOREIGN PATENT DOCUMENTS

| CN | 1251652 A | 4/2000 |
| CN | 1853098 A | 10/2006 |

(Continued)

*Primary Examiner* — Audrey B. Walter
*Assistant Examiner* — Edward Bushard
(74) *Attorney, Agent, or Firm* — Gregory Adams; David L. Cate

(57) ABSTRACT

The invention relates to a device for controlling the swirl of a fluid (2) flowing in a pipeline (1). The invention was based on the object of creating a device with which the adaptation of the swirl (2B) of a fluid (2) flowing in a pipeline (1), even in the case of constantly changing initial swirl (2B), to the desired flow conditions in the pipeline (1) is possible. Said object is achieved in that a swirl measuring device (4) and a swirl control device (6) are provided at predetermined positions of the pipeline (1), and the device has an evaluation and encoder unit (5), wherein, in the presence of differences between the measured actual swirl (2B) and the desired swirl, a corrective value can be determined by means of the evaluation and encoder unit (5), and the swirl control device (6) corresponds with the evaluation and encoder unit (5) and, by means of the swirl control device (6), the present swirl (2B) can be adapted to the predetermined desired swirl in accordance with the determined corrective value.

12 Claims, 1 Drawing Sheet

(51) Int. Cl.
  *F04D 29/66* (2006.01)
  *G01F 1/20* (2006.01)
(58) Field of Classification Search
  CPC ............. F04D 27/0246; Y02T 10/12; F02M
              35/10373; F02M 35/10262; F02M
        35/10157; F05D 2260/14; F05D 2220/40;
          F01D 21/00; F01D 21/003; F17D 1/20;
                                      F17D 1/02
  See application file for complete search history.

(56) References Cited

U.S. PATENT DOCUMENTS

| | | |
|---|---|---|
| 2003/0178084 A1 | 9/2003 | Charron |
| 2005/0011278 A1 | 1/2005 | Brown et al. |
| 2010/0018323 A1 | 1/2010 | Cheng et al. |
| 2017/0090485 A1 | 3/2017 | Ohashi et al. |

FOREIGN PATENT DOCUMENTS

| | | | |
|---|---|---|---|
| CN | 101632004 A | 1/2010 | |
| CN | 106959139 A | 7/2017 | |
| DE | 1489593 A1 | 6/1969 | |
| DE | 102014105166 B3 | 8/2015 | |
| EP | 0764833 A1 * | 3/1997 | ............... G01P 5/14 |
| EP | 0764833 A1 | 3/1997 | |
| EP | 0924416 A2 | 6/1999 | |
| FR | 2357868 A1 | 2/1978 | |

\* cited by examiner

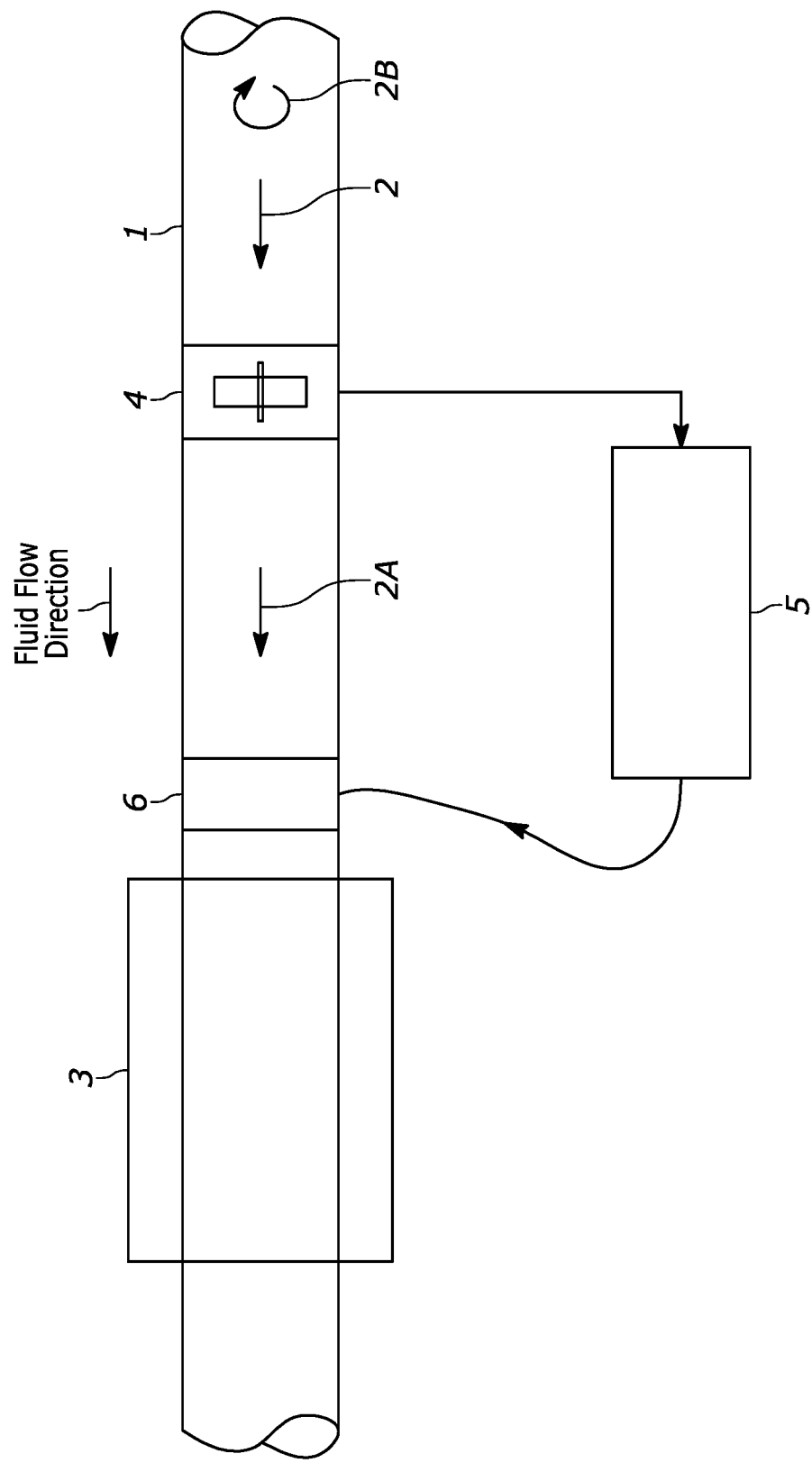

DEVICE FOR CONTROLLING THE SWIRL OF A FLUID FLOWING IN A PIPELINE

The invention relates to a device for controlling the swirl of a fluid flowing in a pipeline.

Fluids flowing through pipelines commonly exhibit swirl. For example, air that is compressed by an exhaust-gas turbocharger is set in rotation by the rotation of the exhaust-gas turbocharger, that is to say exhibits swirl in addition to the translational movement.

Since the exhaust-gas turbocharger changes its rotational speed with the quantity and flow speed of the exhaust gas, the swirl and thus the flow conditions of the charge air in the charge-air line thus also change.

In order to improve efficiency, the charge air must be cooled, normally by means of a charge-air pre-cooler. Here, the available charge-air pre-coolers require particular flow conditions, for example pressure and swirl of the charge air. Since these conditions however change with the operating parameters of the exhaust-gas turbocharger, as discussed in the introduction, optimum efficiency of a pre-cooler is attainable only in very limited operating ranges.

Since charge-air lines in the engine bay of a motor vehicle must be adapted to the installation conditions, bends in the profile of the charge-air line are unavoidable. Such bends may, depending on bend radius and bend direction, generate different pressure losses which are dependent on the swirl direction and the magnitude of the swirl of the charge air. Therefore, in the bend regions, too, it is desirable to not only know the part of the charge air but also adapt it to the geometry of the charge-air lines.

Devices for measuring or for setting a swirl are already known from the prior art. EP 0 764 833 A1 discloses a method in which the swirl in a pipe flow can be determined by means of differential pressure measurements, more accurately than with conventional rotor anemometers.

Methods and devices for generating swirl in flowing media are also already known per se. The German utility model DE 1 489 593 U for instance discloses a throttle device which utilizes an adjustable device for swirl generation in order to impart a swirl to an air flow.

DE 10 2014 105 166 B3 has disclosed a swirl generator for a burner, in the case of which a selectable swirl can be generated through selectable variation of the position of a control blade in relation to static guide blades.

All of the stated methods and devices are however directed to generating pre-selectable swirl magnitudes or swirl directions or measuring the swirl in order to permit the most accurate possible throughflow measurements. Changes in the swirl of fluids in pipelines that arise during ongoing operation are however not provided for in the case of the stated methods and devices.

The invention was based on the object of creating a device with which the adaptation of the swirl of a fluid flowing in a pipeline, even in the case of constantly changing initial swirl, to the desired flow conditions in the pipeline is possible.

Said object is achieved in that a swirl measuring device and a swirl control device are provided at predetermined positions of the pipeline, and the device has an evaluation and encoder unit, wherein, by means of the swirl measuring device, the present swirl can be measured and transmitted to the evaluation and encoder unit and can be compared in the evaluation and encoder unit with a desired swirl associated with the respective position, wherein, in the presence of differences between the measured actual swirl and the desired swirl, a corrective value can be determined by means of the evaluation and encoder unit, and the swirl control device corresponds with the evaluation unit and, by means of the swirl control device, the present swirl can be adapted to the predetermined desired swirl in accordance with the determined corrective value.

Such a device is thus capable, in the presence of changing swirl of the fluid, of performing control with which a predetermined setpoint value can be maintained virtually independently of the initial swirl of the fluid. For example, the throughflow time of the fluid in pre-coolers can be adapted such that the cooling action of the pre-cooler corresponds to the specifications.

In one refinement of the invention, the device is constructed such that, in the flow direction of the fluid, the swirl measuring device is arranged first, and the swirl control device is arranged downstream.

This arrangement has the advantage that the actual swirl can be identified at an early point in time, and the intended swirl is achieved already upstream of the inlet into the respective flow zones of the pipeline.

In one refinement of the invention, the device is constructed such that, in the flow direction of the fluid, the swirl control device is arranged first, and the swirl measuring device is arranged downstream.

This arrangement has the advantage that the maintenance of the setpoint swirl can be monitored in a particularly straightforward manner.

An example of the invention is explained in more detail below on the basis of the drawing.

FIG. 1 shows a diagrammatic illustration of the device according to the invention.

A fluid 2 (not discussed in any more detail) illustrated as an arrow 2A flows through a pipeline 1, in this case in the form of a charge-air line. The pipeline 1 has a pre-cooler 3 through which the fluid 2 flows. The fluid 2 exhibits swirl, which is symbolized here by a rotational arrow 2B.

In a swirl measuring device 4 known per se, which is illustrated merely symbolically here and which is arranged upstream of the pre-cooler 3 in the flow direction of the fluid 2, the swirl 2B of the fluid 2 can be measured, wherein, by means of the measuring device 4, a measurement signal (not illustrated here) can be generated which can be transmitted to an electronic evaluation and encoder unit 5.

In the evaluation and encoder unit 5, the measurement signal of the swirl measuring device 4 can be compared with a predefined setpoint value stored in the evaluation and encoder unit 5, wherein possible deviations between the actual measured swirl 2B and the predefined setpoint value can be identified by means of the evaluation and encoder unit 5. If a deviation arises, a corrective value can be generated by means of the evaluation and encoder unit 5, which corrective value can be transmitted to a swirl controller 6 which is likewise known per se and which is arranged between the swirl measuring device 4 and the pre-cooler 3. By means of the swirl controller 6, the swirl 2B of the fluid 2 can be controlled to a predetermined value in accordance with the corrective value of the evaluation and encoder unit 5.

In this way, it is possible for the swirl 2B upstream of the pre-cooler 3 to be controlled such that it assumes the predetermined value required for optimum efficiency of the pre-cooler 3, virtually independently of the original swirl 2B.

LIST OF REFERENCE DESIGNATIONS

1 Pipeline
2, 2A Fluid

2B Swirl of the fluid 2
3 Pre-cooler
4 Swirl measuring device
5 Evaluation and encoder unit
6 Swirl controller

The invention claimed is:

1. A device comprising a swirl measuring device, a swirl control device, and an evaluation and encoder unit, wherein the swirl measuring device and the swirl control device are provided at predetermined positions of a pipeline, and wherein the pipeline contains fluid having a flow direction;
   wherein, the swirl measuring device measures present swirl of the fluid and transmits present swirl data to the evaluation and encoder unit, wherein present swirl data is compared in the evaluation and encoder unit with a desired swirl associated for the fluid at the position of the swirl measuring device;
   wherein, in presence of differences between the measured actual swirl data and the desired swirl, a corrective value is determined by the evaluation and encoder unit, and wherein the swirl control device corresponds with the evaluation and encoder unit; and,
   wherein the swirl control device adapts swirl of the fluid to the predetermined desired swirl in accordance with the determined corrective value; and
   the pipeline comprises a pre-cooler through which the fluid flows.

2. The device according to claim 1, wherein swirl of the fluid flowing in the pipeline is controlled by the device.

3. The device according to claim 1, wherein the pipeline is a charge-air line.

4. The device according to claim 1, wherein swirl of the fluid upstream of the pre-cooler is controlled such that it assumes a predetermined value required for optimum efficiency of the pre-cooler.

5. The device according to claim 1, wherein the swirl measuring device and the swirl control device are arranged upstream of the pre-cooler.

6. The device according to claim 1, wherein the evaluation and encoder unit is an electronic evaluation and encoder unit.

7. The device according to claim 1, the evaluation and encoder unit compares a measurement signal of the swirl measuring device with a predefined setpoint value and generates and provides a corrective value to the swirl controller based on the comparison.

8. The device according to claim 1, wherein in the flow direction of the fluid, the swirl control device is arranged first, and the swirl measuring device is arranged downstream.

9. The device according to claim 8, wherein actual swirl of the fluid is monitored.

10. The device according to claim 9, wherein the actual swirl of the fluid is maintained according to the predetermined desired swirl.

11. A device comprising a swirl measuring device, a swirl control device, and an evaluation and encoder unit, wherein the swirl measuring device and the swirl control device are provided at predetermined positions of a pipeline, and wherein the pipeline contains fluid having a flow direction;
   wherein, the swirl measuring device measures present swirl of the fluid and transmits present swirl data to the evaluation and encoder unit, wherein present swirl data is compared in the evaluation and encoder unit with a desired swirl associated for the fluid at the position of the swirl measuring device;
   wherein, in presence of differences between the measured actual swirl data and the desired swirl, a corrective value is determined by the evaluation and encoder unit, and wherein the swirl control device corresponds with the evaluation and encoder unit;
   wherein the swirl control device adapts swirl of the fluid to the predetermined desired swirl in accordance with the determined corrective value; and
   wherein in the flow direction of the fluid, the swirl measuring device is arranged first, and the swirl control device is arranged downstream.

12. The device according to claim 11, wherein actual swirl of the fluid is identified at an early point in time, and intended swirl of the fluid, according to the predetermined desired swirl, is achieved upstream of an inlet into flow zones of the pipeline.

* * * * *